(12) United States Patent
Xu et al.

(10) Patent No.: US 12,397,494 B2
(45) Date of Patent: Aug. 26, 2025

(54) ONE-STEP FORMATION OF AN INTEGRATED COMPOSITE STRUCTURE COMPRISING CURED MORTAR LAYERS AND A POLYURETHANE LAYER BY 3D PRINTING

(71) Applicant: SIKA TECHNOLOGY AG, Baar (CH)

(72) Inventors: Hang Xu, Chigasaki-chi (JP);
ShengZhong Zhou, Shanghai (CN);
Bang Wei Xi, Shanghai (CN); Xi Tao Liu, Shanghai (CN); Li Xia Wang, Shanghai (CN); He Meng Zhao, Shanghai (CN); Bernhard Feichtenschlager, Trostberg (DE);
Stefan Hirsemann, Shanghai (CN)

(73) Assignee: SIKA TECHNOLOGY AG, Baar (CH)

( * ) Notice: Subject to any disclaimer, the term of this patent is extended or adjusted under 35 U.S.C. 154(b) by 469 days.

(21) Appl. No.: 17/619,153

(22) PCT Filed: Jun. 10, 2020

(86) PCT No.: PCT/EP2020/066083
§ 371 (c)(1),
(2) Date: Dec. 14, 2021

(87) PCT Pub. No.: WO2020/249612
PCT Pub. Date: Dec. 17, 2020

(65) Prior Publication Data
US 2022/0305717 A1    Sep. 29, 2022

(30) Foreign Application Priority Data

Jun. 14, 2019 (WO) ............... PCT/CN2019/091338

(51) Int. Cl.
*B29C 64/106* (2017.01)
*B28B 1/00* (2006.01)
(Continued)

(52) U.S. Cl.
CPC ............ *B29C 64/106* (2017.08); *B28B 1/001* (2013.01); *B28B 3/2636* (2013.01);
(Continued)

(58) Field of Classification Search
CPC .......... B29C 64/10–124; B29C 64/106; B29C 64/209; B28B 1/001; B28B 3/2636;
(Continued)

(56) References Cited

U.S. PATENT DOCUMENTS 3,437,608 A * 4/1969 Pohl ................... C08G 18/6622
  521/162
4,211,680 A * 7/1980 Shearing ................. C08L 75/00
  524/871

(Continued)

FOREIGN PATENT DOCUMENTS

CN   108947418 A   12/2018
CN   109400031 A   3/2019
(Continued)

OTHER PUBLICATIONS

English translation of CN-109400031-A by EPO. (Year: 2019).*
(Continued)

*Primary Examiner* — Xiao S Zhao
*Assistant Examiner* — Inja Song
(74) *Attorney, Agent, or Firm* — Oliff PLC

(57) ABSTRACT

The present invention relates to a process of fabricating a multi-layer composite structure by 3D printing, said composite structure comprises at least one cured mortar layer formed by curing of a mortar composition, and at least one polyurethane layer formed by polymerization of a first polyurethane forming composition, wherein said mortar composition and said first polyurethane forming composition are dispensed individually and simultaneously via adja-
(Continued)

cent printing nozzles. The mortar composition is optionally modified by a second polyurethane forming composition.

22 Claims, 4 Drawing Sheets

(51) Int. Cl.
    *B28B 3/26*     (2006.01)
    *B28B 19/00*     (2006.01)
    *B29C 64/209*     (2017.01)
    *B33Y 10/00*     (2015.01)
    *B33Y 70/10*     (2020.01)

(52) U.S. Cl.
    CPC ........ *B28B 19/003* (2013.01); *B28B 19/0046* (2013.01); *B29C 64/209* (2017.08); *B33Y 10/00* (2014.12); *B33Y 70/10* (2020.01)

(58) Field of Classification Search
    CPC ..... B28B 19/003; B28B 19/0046; B28B 3/20; B33Y 10/00; B33Y 70/10; B33Y 80/00; B29L 2031/10; C04B 7/02; C04B 28/02; C04B 2103/32; C04B 2111/00181; C04B 2111/00612; C04B 26/16; C04B 14/06; C04B 24/06; C04B 24/2623; C04B 24/386; C04B 28/065
    See application file for complete search history.

(56) References Cited

U.S. PATENT DOCUMENTS

2017/0129153 A1     5/2017   Koivuharju
2017/0365365 A1*  12/2017  White .................. H05K 9/0001
2019/0276364 A1*   9/2019  Sautreuil ................ C04B 28/06

FOREIGN PATENT DOCUMENTS

WO   WO-2018202842 A1 * 11/2018 ............ B28B 1/001
WO       2019/038297 A1    2/2019

OTHER PUBLICATIONS

Verdolotti (Verdolotti, L., Di Maio, E., Lavorgna, M., Iannace, S. and Nicolais, L. (2008), Polyurethane-cement-based foams: Characterization and potential uses. J. Appl. Polym. Sci., 107: 1-8. https://doi.org/10.1002/app.24997) teaches polyurethane-cement based foam (abstract, table II). (Year: 2007).*
International Search Report for Application No. PCT/EP2020/066083 dated Sep. 3, 2020.
Written Opinion for Application No. PCT/EP2020/066083 dated Sep. 3, 2020.
Aleksandr Inozemtcev, et al., Technical and economic efficiency of materials using 3D-printing in construction on the example of high-strength lightweight fiber-reinforced concrete, E3S Web of Conferences, May 26, 2019, pp. 1-10, vol. 97.
Maria Kaszynka, et al., Thermal-Humidity Parameters of 3D Printed Wall, IOP Conference Series: Materials Science and Engineering, Feb. 1, 2019, pp. 1-9, vol. 471.

* cited by examiner

ONE-STEP FORMATION OF AN INTEGRATED COMPOSITE STRUCTURE COMPRISING CURED MORTAR LAYERS AND A POLYURETHANE LAYER BY 3D PRINTING

CROSS REFERENCE TO RELATED APPLICATIONS

This application is a national stage application of International Application No. PCT/EP2020/066083, filed 10 Jun. 2020, which claims priority from International Application No. PCT/CN2019/091338, filed 14 Jun. 2019, both of which applications are incorporated herein by reference.

Multi-layer composite structures comprising a cured mortar layer and a polyurethane layer are known and commonly used in construction industries. For one example, CN105220820A discloses a light weight flame resistant concrete precast slab, comprising a surface layer of glass fiber and carbon fiber web, a flame-resistant layer comprising cement, an insulation layer of a polyurethane layer covered by a mortar layer, a concrete layer comprising cement, an insulation layer and a flame-resistant layer. For another example, CN204386088U discloses a heat-insulating decorative panel, comprising an outer decorative panel made of flexible stone, a core layer made of high flame resistant PIR polyurethane hard foam and an inner liner made of alkali-resistant glass fiber mortar. Said three layers were hot-pressed to form said heat-insulating decorative panel, which is later coated with common polymer binding mortar and adhered to the substrate of the wall surface as insulation and decoration of outer wall. For yet another example, CN103821236A discloses a polyurethane insulation material, comprising a cement coil material, a polyurethane foamed layer and a flame-retardant layer made of rock wool or glass wool, wherein the cement coil material is directly adhered to wall to ensure strong binding with the wall, the foamed polyurethane layer provides insulation, and the stone wool or glass wool layer provides flame retardancy. In such composite structures described above, each layer provides its unique function so that the overall performance of the composite structure is improved without undue requirement on the performance of materials. However, the composite structures are generally manufactured in a complex manner by manufacturing and assembling each layer. Besides, additional adhesive materials are usually required to ensure good binding between different layers.

One-step formation of 3D structures of polyurethane or cured mortar by 3D printing is also known. For one example, CN103331817A discloses that concrete can be jetted onto the surface of a framework or inside a framework made of steel bars, girders and steel cylinders by a 3D printer to form an engineering structure. However, there is no disclosure of the requirement of the concrete and the method to adjust the formulation of the concrete to meet the requirement. For another example, CN104479343A discloses a polyurethane material for 3D printing comprising polyol, polyisocyanate and catalyst and further discloses that the hardness of the product can be adjusted by using polyether polyols with different molecular weight.

To the best knowledge of the inventors, there is no disclosure of one-step formation of multi-layer composite structures comprising a cured mortar layer and a polyurethane layer using 3D printing. Such one-step formation is expected to provide both improved productivity of the composite structure and better mechanical properties such as binding strength between the cured mortar layer and the polyurethane layer, as the process involves only one processing step that is highly automated and the structure obtained thereof is an integrated composite structure. Thanks to the adhesive nature of polyurethane, the composite structure thus obtained can be formed as an integrated structure without using any additional adhesive. It is, therefore, the purpose of this invention to provide such a process and an integrated composite structure obtainable by 3D printing.

In principle, multi-layer structures comprising multiple solid layers can be formed by 3D printing by jetting the respective forming fluids separately from multiple parallelly configured printing nozzles and allowing the jetted fluids to solidify. Thus, as an example, the following three materials are jetted individually and simultaneously from three parallel printing nozzles: i) a mortar composition which can be cured into a layer of cured mortar, ii) a polyurethane-forming composition which can be polymerized into a layer of polyurethane, and ijj) a mortar composition which can be cured into a layer of cured mortar. The nozzles are mounted on a mobile carriage which can move under the control of a computer on X axis and Y axis on a horizontal plane. The printing materials are jetted along with the movement of the nozzles to form a slice of a sandwich structure of cured mortar/polyurethane/cured mortar. When one slice is completed, the mobile carriage is raised on the direction of vertical Z axis to a new vertical plan so that the printing nozzles are positioned to move in a different plane above the previously formed slice(s). Consequently, the newly formed slice is stacked on top of the previously formed slices. When the printing nozzles are positioned carefully, the layers of cured mortar/polyurethane/cured mortar in different stacked slices will assemble respectively into three layers of cured mortar/polyurethane/cured mortar. A three-layer composite structure of cured mortar/polyurethane/cured mortar is thus obtained in this manner.

However, forming an integrated composite structure comprising cured mortar layers and polyurethane layer in one step is difficult. For example, when the mortar composition/polyurethane-forming composition/mortar composition are jetted individually and simultaneously from three parallel nozzles, if the initial flowability or the curing reaction rate of the mortar composition or the polyurethane forming composition is too high or too low, it will not be possible to form and maintain the respective sub-structures of the printing materials in desired shapes at the desired position and time, so the desired composite structure cannot be obtained. Therefore, it has yet to be discovered the proper conditions and parameters for manufacturing such an integrated composite structure by 3D printing, including requirements for printing materials and printers.

In one aspect, the present invention relates to a process of fabricating a multi-layer composite structure by 3D printing, said composite structure comprises at least one cured mortar layer formed by curing of a mortar composition, and at least one polyurethane layer formed by polymerization of a first polyurethane forming composition, wherein said mortar composition and said first polyurethane forming composition are dispensed individually and simultaneously via adjacent printing nozzles.

In a second aspect, the present invention relates to a multi-layer composite structure obtained or obtainable according to the process.

The inventors have found that, by individually and simultaneously dispensing via adjacent printing nozzles a mortar composition and a first polyurethane forming composition with certain properties by a moving device with certain parameters, i.e. a 3D printer, said mortar composition and first polyurethane forming composition can be dispensed and solidified to form a multi-layer integrated composite structure comprising a cured mortar layer and a polyurethane layer in one step. No prior art has been identified to have disclosed such one-step formation of integrated composite structure comprising materials of great difference in nature, such as mortar and polyurethane.

The present inventors have further found that, by modifying the mortar composition with a second polyurethane forming composition to obtain a polyurethane modified mortar, the binding of cured mortar layer and the neighboring polyurethane layer can be improved.

Unless described otherwise, the term "mortar composition" denotes a composition comprising water, cement and optional lime and sand, which is intended to cure and produce corresponding cured mortar. The term "cured mortar" denotes the solidified product of the mortar composition after curing.

Unless described otherwise, the term "polyurethane forming composition" denotes a composition comprising isocyanates and isocyanate reactive compounds which are intended to react and polymerize to form polyurethane. "Polyurethane" denotes the polymeric material obtained from the polyurethane forming composition after polymerization. As used herein, the term "first polyurethane forming composition" refers to the polyurethane forming composition dispensed and polymerized to form the polyurethane layer in the composite structure. The term "second polyurethane forming composition" refers to the polyurethane forming composition used to modify the mortar composition. The numbering is not indented to limit the nature of the polyurethane forming composition, i.e. the first and second polyurethane forming composition can be the same or different.

The process of the present invention can be exemplified by a process in which a three-layer composite structure of an optionally modified mortar layer/polyurethane layer/optionally modified mortar layer is formed. During the printing process, the optionally modified mortar composition, the polyurethane forming composition and the optionally modified mortar composition are individually and simultaneously jetted from three parallel 3D printing nozzles. The optionally modified mortar compositions and the polyurethane forming composition then solidify independently, forming a slice of a sandwich structure with three layers of cured, optionally modified mortar/polyurethane/cured, optionally modified mortar in one pass of the printing nozzles. By repeating the printing pass which forms a slice of sandwich pattern and stacking the slices on top of another, an integrated composite structure of optionally modified mortar layer/polyurethane layer/optionally modified mortar layer can be obtained. It should be noted that the two optionally modified mortar compositions can be the same or different.

Figure 1A:
FIG. 1A shows an exemplary printing nozzle arrangement of three parallel nozzles used in 3D printing.
Figure 1B:
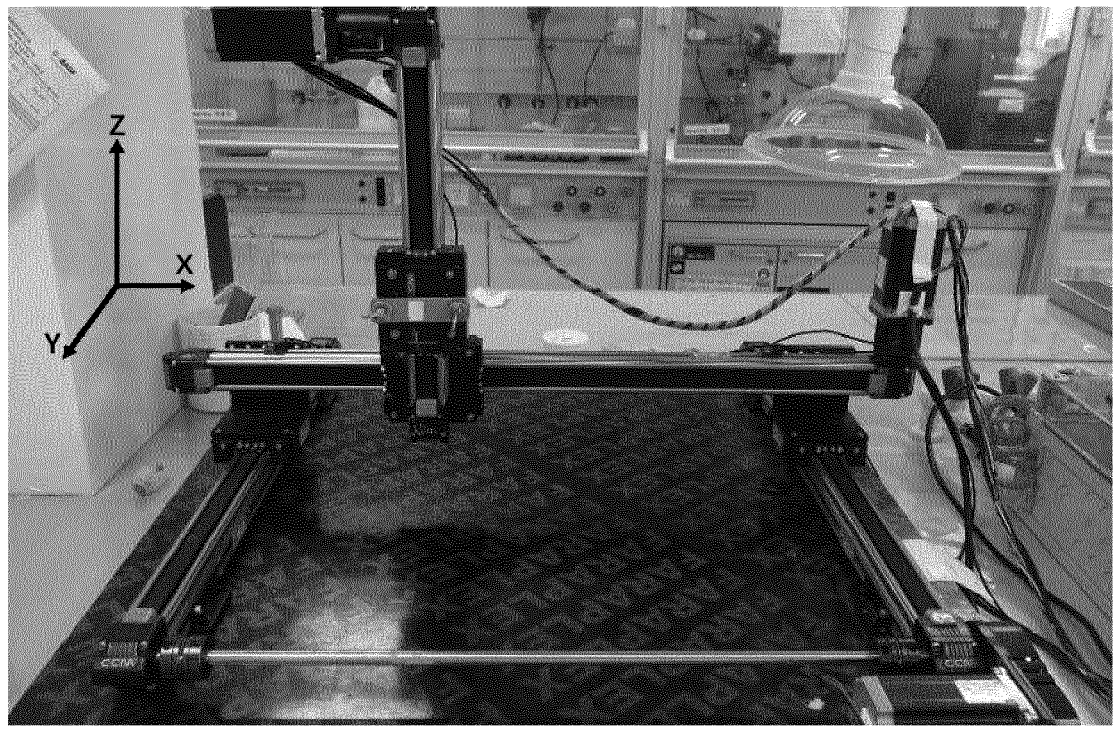
FIG. 1B shows an exemplary arm machine for 3D printing.
Figure 3:
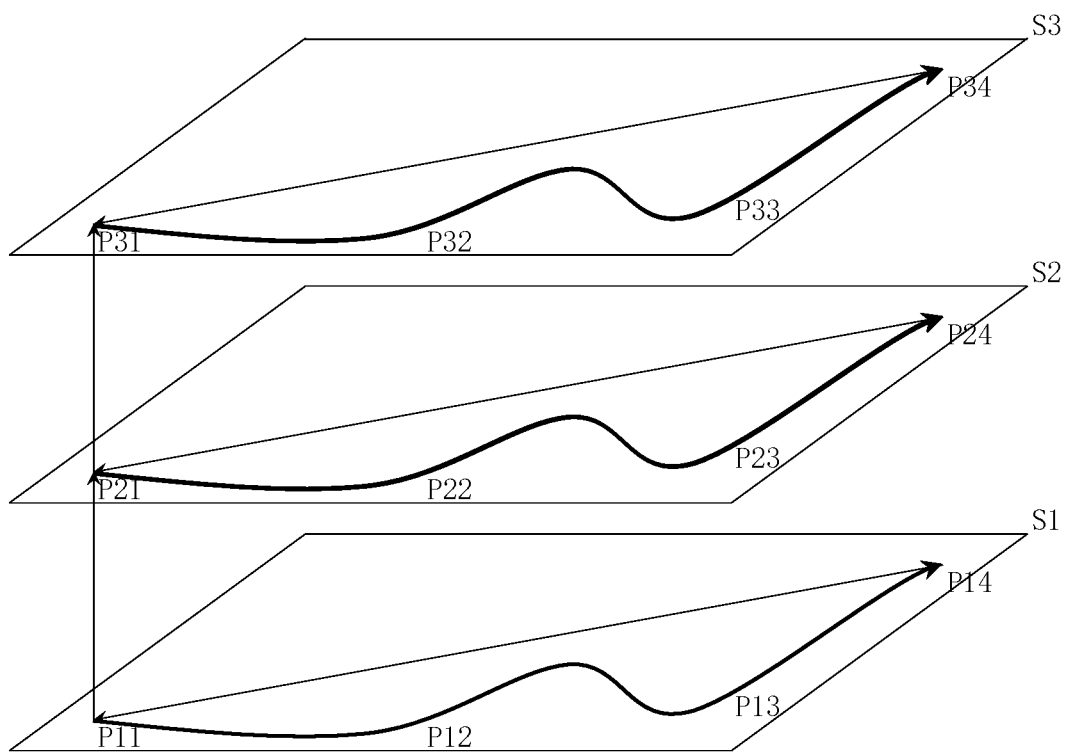
FIG. 3 shows an exemplary printing process in which a W shaped structure is printed by stacking three slices.

FIG. 3 shows an exemplary printing process in which a W shaped 3D structure is printed in three layers. A bundle of three parallel printing nozzles (as shown in FIG. 1A) is mounted on the 3D printing arm machine (as shown in FIG. 1B) and positioned at point P11. As previously programmed according to the desired shape of the final product, the bundle moves on a horizontal plane to point P12-P13-P14 along the bold line while jetting the optionally modified mortar compositions and the polyurethane forming composition via the three printing nozzles. After P14, the bundle moves back to P11 from P14 along the straight line P11-P14 without jetting materials from the nozzles and completes printing three adjacent layers of printing materials, which assemble to form Slice S1. The bundle then moves upward vertically to point P21 to start printing Slice S2 in the same manner and later prints Slice S3. After completing printing all three slices, the full structure comprising optionally modified mortar 1/polyurethane/optionally modified mortar 2 with a W shape will be completed. It shall be noted that the three printing nozzles are arranged in a manner that: (1) the center of the nozzle in the middle moves along the bold line in FIG. 3; (2) the three nozzles are such aligned that the central line passing central points of each nozzle is straight and is always perpendicular to the tangent of the bold line in FIG. 3. To meet the requirements, the positioning of the printing nozzles and the respective jetting velocities of the printing materials shall be carefully programmed, especially when printing 3D structures of complicated shapes. For example, the printing nozzle on the outer ring that has to cover a bigger curvature will dispense the printing materials at a higher jetting velocity compared to the printing nozzle on the inner ring. The printing speed is proportional to the respective curvature.

Clearly, those skilled in the art can envision similar processes with other moving pattern of the printing nozzle bundle or the configuration of the printing nozzle bundle per se. For example, the thickness of layer of cured mortar or layer of polyurethane can be adjusted by the size of the printing nozzle. The dimension (i.e. length and width) of the composite structure can be adjusted by the movement of the printing nozzles on the horizontal or vertical plane.

The present inventors have investigated the proper conditions and parameters for manufacturing an integrated composite structure by 3D printing, including requirements for printing materials and printers. It was found that a proper flowing and curing behavior (collectively "workability") of the optionally modified mortar composition and the first polyurethane forming composition are essential for the one-step formation of an integrated 3D composite structure.

The flowing behavior of the optionally modified mortar composition is characterized by slump, which is measured according to China national standard GB/T50080-2002. The slump of the optionally modified mortar composition should be within an appropriate range; if it is too low, the optionally modified mortar composition is too viscous to be jetted; if it is too high, the optionally modified mortar cannot hold its position and shape to confine the jetted first polyurethane forming composition.

The curing behavior of the first polyurethane forming composition is characterized by gel time t1, which is measured as follows: a sample of the first polyurethane forming composition is prepared by mixing all the ingredients in a beaker by an IKA overhead mixer. A timer is started immediately when the mixing starts. The sample is stirred and mixed at 500 rpm for 10 to 15 seconds. A wooden rod is vertically lowered from above the surface of the sample to a depth of 4 mm below the surface of the sample, and then pulled up vertically from the surface at a speed of 3 cm/s. The lower-contact-pull action is repeated every five seconds. Initially, the sample is watery so when the rod is pulled up, the sample attached to the rod drops back into the beaker. After a while, as the sample gels, a continuous filament of the sample can be drawn by the rod when the rod is pulled up. The timer is then immediately stopped, and the time is recorded as gel time t1 of the sample.

The curing behavior of the mortar composition without modification is characterized by initial setting time t2, which is measured according to China national standard GB/T 1346-2011.

The curing behavior of the modified mortar composition is characterized by pot life t3, which is measured as follows: a sample of the modified mortar is prepared by mixing all ingredients in a beaker by an IKA overhead mixer. A timer is started immediately when the mixing starts. The sample is stirred and mixed at 500 rpm for three minutes. The mixture is casted in to a mold, forming a film of about 4 mm thickness. A scratch is drawn using a wooden rod on the surface of the film at a depth of 4 mm. The process is repeated every minute. Initially, the mixture is thin so when the surface is scratched, the scratch disappears shortly. When the mixture thickens and is no longer capable of restoring the surface of the film after scratching, the timer is stopped, and the time lapsed is recorded as pot life of the sample.

As t1, t2 and t3 are used to characterize the workability of the respective materials, it is understood that within t1, t2 or t3, the respective material remains workable, although solidifying processes are in process. When t1, t2 or t3 has past, the respective material has reacted and solidified to such an extent that the corresponding composition is no longer workable, as the composition is not sufficiently flowable. Therefore, after t1, t2 or t3, the respective material shall solidify and maintain a fixed shape.

Without limiting the present invention to a particular theory or mechanism, the working mechanism to fabricate the 3D composite structure of modified mortar layer/polyurethane layer/modified mortar layer is further described in detail hereafter. After exiting the nozzles, the two jetted streams of the optionally modified mortar compositions form barriers to confine the first polyurethane forming composition, which flows and fills the space between the barriers of partially cured mortar compositions. The jetted materials, including optionally modified mortar compositions and the first polyurethane forming composition, then solidify to form the cured mortar layers and the polyurethane layer and maintain their respective shape because of the selected workability profile. Contrary to the intuitive that the printing materials dispensed from the printing nozzle bundle shall have similar curing behavior, the inventors have surprisingly found that materials having much different curing behavior like the optionally modified mortar compositions and the first polyurethane forming composition used in the present invention can still be used for 3D printing. Even if the optionally modified mortar compositions solidify much slower than the first polyurethane forming composition, the specific flowing performance of the optionally modified mortar composition, a.k.a. the relatively small slump, makes it possible for the optionally modified mortar composition to hold its position and shape after being jetted. Consequently, the jetted optionally modified mortar compositions can provide barriers to confine the jetted first polyurethane forming composition, which gels relatively fast and fills the space between the mortar barriers. It should be further pointed out that the solidification of the first polyurethane forming composition and the optionally modified mortar composition cannot be too slow, otherwise the printing process will be too slow.

In one embodiment of the present invention, the mortar composition, modified or not, comprises sand, cement and water that are conventionally used in the industry. The sand is preferably commercial sand of 30 to 100 meshes, preferably 50 to 100 meshes. The cement is preferably commercial composite silicate cement such as PC32.5R, aluminate cement, sulphoaluminate cement, or ferri-alumninate cement. The type of sand and cement, as well as the composition of mortar can be determined by those skilled in the art via conventional experimentation to meet the requirement of slump and initial setting time. For example, the ratio of sand to cement can be determined by those skilled in the art via conventional experimentation and is preferably 2:8 to 8:2, more preferably 3:7 to 7:3 by weight. The ratio of water to cement can be determined by those skilled in the art via conventional experimentation and is preferably 1:9 to 5:5, more preferably 1:9 to 2:8 by weight.

Preferably, the mortar composition of the present invention further comprises additives conventionally used in the industry, such as alkaline filler (for example, calcium oxide and calcium hydroxide), polymer powder and thickener (for example, cellulose ether, such as Walocel Mw 15000 PFV cellulose ether commercially available from Dow, Midland, MI, USA). The content of the additives in the mortar composition can be determined by those skilled in the art via conventional experimentation. For example, alkaline filler can be 1% to 10%, preferably 1% to 5% by weight based on the total weight of the mortar composition. Polymer powder can be 0.1% to 5%, preferably 0.1% to 2% by weight based on the total weight of the mortar composition. Thickener can be 0.01% to 0.5%, preferably 0.01% to 0.2% by weight based on the total weight of the mortar composition.

Flowing properties of the inventive mortar composition can be further adjusted by the addition of a super plasticizer. Said super plasticizer can be, for example, super plasticizer V-30, MVA series or PCE series commercially available from BASF SE, Ludwigshafen, Germany. The amount of said super plasticizer can be 0.05% to 1.5% by weight, preferably 0.35% to 1% by weight based on the total weight of the mortar composition.

Preferably, all ingredients of the mortar composition are mixed before being introduced to the printing nozzle. The mixture can be produced in-situ and then fed to the 3D printer via an on-line mixing and pumping system, especially for one-step formation of a 3D structure that requires a long overall printing time and a relatively short initial setting time t2, so as to avoid curing of the mortar composition inside the 3D printer, which would lead to failure of 3D printing.

In a preferred embodiment of the present invention, slump of the optionally modified mortar composition can be, for example, 10 to 100 mm, preferably 30 to 90 mm, more preferably 50 to 70 mm.

In a preferred embodiment of the present invention, initial setting time t2 of the mortar composition can be, for example, 0.5 to 4 hours, preferably 1 to 2 hours.

In one embodiment of the present invention, the first polyurethane forming composition is non-foamed polyurethane. In an alternative embodiment of the present invention, the first polyurethane forming composition is polyurethane foam. In another embodiment of the present invention, the first polyurethane forming composition is selected from polyurethane forming compositions conventionally used to form polyurethane foam. The first polyurethane forming composition comprises, for example, a polyester polyol and/or polyether polyol with two or more hydroxyl groups (such as Lupranol 3300 commercially available from BASF SE, Ludwigshafen, Germany), and an isocyanate selected from aliphatic, alicyclic and aromatic isocyanates or prepolymer thereof with two or more isocyanate groups (such as methylene diphenyl diisocyanate, MDI), wherein the equivalent ratio of the isocyanate groups to hydroxyl groups is preferably 1.1:1 to 2:1, more preferably 1.2:1 to 1.75:1.

In a preferred embodiment of the present invention, the first polyurethane forming composition can further comprise a blowing agent conventionally used in the formation of polyurethane foams (such as water), at a content of 0.5 to 3%, preferably 1 to 2% by weight based on the total weight of the first polyurethane forming composition. The foaming factor of the first polyurethane forming composition of the present invention is preferably from 5 to 50, more preferably from 25 to 35, so that the inventive polyurethane foam has a porous structure that can be suitably used as an insulation material.

In a preferred embodiment of the present invention, the first polyurethane forming composition can further comprise additives conventionally used in the formation of polyurethane foams, such as an amine or metallic catalyst (for example, POLYCAT series, DABCO series commercially available from Evonik Industries AG, Essen, Germany, and tin dibutyl dilaurate), a foam stabilizer (for example, Niax Silicone L6900 commercially available from Momentive Performance Materials Inc., New York, USA), an inert filler (for example, Arosil 200 commercially available from Evonik Industries AG, Essen, Germany), and a wetting dispersant (for example, wetting dispersant LT-9004 commercially available from Onvitec bio-technology Co. Ltd, Shenzhen, China). The respective amount of the additives can be determined by those skilled in the art via conventional experimentation. For example, said catalyst can be added at an amount of 0.01 to 1%, preferably 0.1 to 0.5%, foam stabilizer at an amount of 0.01 to 2%, preferably 0.5 to 1%, inert filler at an amount of 1 to 5%, preferably 2 to 3%, wetting dispersant at an amount of 1 to 10%, preferably 2 to 8%, each by weight based on the total weight of the first polyurethane forming composition.

In embodiments of the present invention, the first polyurethane forming composition of the present invention can be a single component composition or a double component composition comprising Component A comprising polyol and Component B comprising isocyanate. When a double component composition is used, the two components can be mixed before entering the printing nozzle, or the two components can be jetted from different pipes configured inside the same nozzle and be mixed after exiting the nozzle, e.g. when filling the space defined by two mortar barriers.

In a preferred embodiment of the present invention, the gel time t1 of the first polyurethane forming composition can be 0.5 to 10 minutes, preferably 1 to 5 minutes.

One or several polyurethane layers can be formed and used in the present invention, wherein the one layer or each of the several polyurethane layers is preferably sandwiched between cured mortar layers, respectively. The first polyurethane forming composition forming said multiple layers can be the same or different from each other. The polyurethane layers can be further processed by means known to those skilled in the art, for example, they can be reinforced by glass fiber or carbon fiber.

In a preferred embodiment of the present invention, the inventive mortar composition is modified by a second polyurethane forming composition so as to obtain a polyurethane modified mortar composition. The second polyurethane forming composition for the modification of the mortar composition can be the same or different from the first polyurethane forming composition.

Similar to the first polyurethane forming composition, in one embodiment of the present invention, the second polyurethane forming composition can be selected from polyurethane forming compositions conventionally used to form polyurethane. The second polyurethane forming composition comprises, for example, a polyester polyol and/or polyether polyol with two or more hydroxyl groups (such as Lupranol 3300 commercially available from BASF SE, Ludwigshafen, Germany), and an isocyanate selected from aliphatic, alicyclic and aromatic isocyanates or prepolymer thereof with two or more isocyanate groups (such as methylene diphenyl diisocyanate, MDI). The equivalent ratio of the isocyanate groups to hydroxyl groups is preferably 1.1:1 to 2:1, more preferably 1.2:1 to 1.75:1.

The inventors have found that, the modification of mortar composition by a second polyurethane forming composition not only contributes to the improved binding between the cured mortar layer and the polyurethane layer, but also tunes the curing behavior of the mortar composition. Therefore, in order to obtain a mortar composition, modified or not, with a curing behavior proper for this invention, it is possible to either adjust the initial setting time t2 by adjusting the formulation of the unmodified mortar composition, or adjust the pot life t3 by adding a second polyurethane forming composition and adjusting the formulation of both the second polyurethane forming composition and the mortar composition. It is well within the knowledge of those skilled in the art to conduct the necessary experimentation to do so.

Similar to the first polyurethane forming composition, in a preferred embodiment of the present invention, the second polyurethane forming composition can further comprises additives conventionally used in the formation of polyurethane foams, such as an amine or metallic catalyst (for example, POLYCAT series, DABCO series commercially available from Evonik Industries AG, Essen, Germany, and tin dibutyl dilaurate), a foam stabilizer (for example, Niax Silicone L6900 commercially available from Momentive Performance Materials Inc., New York, USA), and an inert filler (for example, Arosil 200 commercially available from Evonik Industries AG, Essen, Germany). The respective amount of the additives can be determined by those skilled in the art via conventional experimentation. For example, said catalyst can be added at an amount of 0.01 to 1%, preferably 0.1 to 0.5%, foam stabilizer at an amount of 0.01 to 2%, preferably 0.5 to 1%, inert filler at an amount of 1 to 5%, preferably 2 to 3%, wetting dispersant at an amount of 1 to 10%, preferably 2 to 8%, each by weight based on the total weight of the first polyurethane forming composition.

The second polyurethane forming composition can be mixed with the mortar composition before or after being jetted from the printing nozzle. Preferably, the second polyurethane forming composition is mixed with the mortar composition before being fed to the 3D printer. The mixture is then introduced into the printing nozzle immediately after mixing. The mixture can be produced in-situ and then fed to the 3D printer via an on-line mixing and pumping system, especially for one-step formation of a 3D structure that requires a long overall printing time and a relatively short pot life t3, so as to avoid curing of the modified mortar composition inside the 3D printer, which would lead to clogging of the printer.

The total amount of the second polyurethane forming composition used to modify the mortar composition can be 0.1% to 50%, preferably 5% to 30%, more preferably 10% to 20% by weight based on the total weight of the modified mortar composition.

In a preferred embodiment of the present invention, the pot life t3 of the inventive mortar composition modified by the second polyurethane forming composition is 0.05 to 2 hours, preferably 0.1 to 1 hours, more preferably 0.2 to 0.5 hours.

The number of cured, optionally modified mortar layers in the composite structure of the present invention can be two or more, wherein the mortar composition for each cured, optionally modified mortar layer can be the same or different. The cured, optionally modified mortar layers can be further processed by means known to those skilled in the art, for example, they can be reinforced by glass fiber or carbon fiber.

The present invention involves a one-step process to fabricate an integrated multi-layer composite structure via 3D printing, wherein the multi-layer composite structure comprises a cured mortar layer formed by a mortar composition optionally modified by the second polyurethane forming composition and a polyurethane layer formed by the first polyurethane forming composition, and a 3D composite structure made thereof. Said process has several advantages such as better operation and cost efficiency, better capacity of producing complicated shapes, all of which are advantages of 3D printing technology. The integrated multi-layer composite structures comprising mortar layer and polyurethane layer made thereof has superior mechanical properties, such as improved binding strength between layers, as compared with those produced by conventional process in which cured mortar layer and polyurethane layer are individually produced and later combined by additional adhesives. Furthermore, the improved binding strength is achieved without using additional adhesives. Those skilled in the art will appreciate that this will render the structure advantageous in mechanical properties such as impact resistance and cracking resistance. The composite structure comprising a mortar layer and a polyurethane layer will also have performances common to composite structures comprising similar materials, eg. heat insulation and flame retardancy.

Preferably, the inventive integrated multi-layer composite structure comprising cured mortar and polyurethane is a sandwiched three-layer structure comprising cured mortar layer/polyurethane layer/cured mortar layer.

The inventors have further found that a good match of t1 and t2 or t3 can help achieve successful 3D printing of the present invention. Preferably, t1 and t2 should satisfy the following relationship: t2−t1<2 hours, more preferably t2−t1<1.5 hours, even more preferably t2−t1<1 hours. Preferably, t1 and t3 should satisfy the following relationship: t3−t1<0.5 hours, more preferably t3−t1<0.4 hours, even more preferably t3−t1<0.25 hours.

Those skilled in the art can envision that each of the cured mortar layer and polyurethane layer can consists of cured mortar sublayers and polyurethane sublayers. The cured mortar sublayers and polyurethane sublayers may comprise different types of cured mortar and polyurethane. For example, the bundle of printing nozzles may consist of four printing nozzles, namely A1, B1, B2 and A2, with nozzles A1 and A2 jetting two different types of mortar compositions and B1 and B2 jetting two types of polyurethane forming compositions. In this way, the integrated composite structure of cured mortar layer/polyurethane layer/cured mortar layer maintains its three-layered structure, while the polyurethane layer comprises two polyurethane sublayers.

Those skilled in the art can select the two types of polyurethane forming compositions based on prior art teaching and limited experimentation.

Additional features and advantages of the invention will be better understood by considering the following description of examples thereof, taken in conjunction with the accompanying figures.

Example 1

Example 1 shows how to produce an integrated composite structure comprising cured mortar layers and a polyurethane layer by 3D printing in one single step. Example 1 demonstrates the production of an integrated composite structure of cured mortar layer/polyurethane layer/cured mortar layer by using mortar compositions and polyurethane forming compositions of selected properties.

The mortar composition was produced by thorough mixing of ingredients according to the formulation in Table 1. The initial setting time of the mortar composition was about 1 hour. The slump of the mortar composition was 60 mm. The density of the mortar composition is about 1.5-2 g/cm$^3$.

TABLE 1

|  | Ingredient | Amount (g) |
| --- | --- | --- |
| Mortar | Silicate cement PC32.5R | 110 |
|  | Sulphoaluminate cement | 20 |
|  | F5 sand (30 to 50 meshes) | 60 |
|  | Polyvinyl acetate powder | 2 |
|  | WALOCEL Mw 15000 | 0.1 |
|  | Citric acid | 1.5 |
|  | BASF super plasticizer V-30 | 2 |
|  | Water | 33 |

The Component A and Component B of the two-component first polyurethane forming composition was produced separately according to the following formulation in Table 2 by thorough mixing of their respective ingredients. After mixing Component A and Component B, the gel time of the first polyurethane forming composition was about 60 seconds.

TABLE 2

|  | Ingredient | Amount (g) |
| --- | --- | --- |
| Component A of the first polyurethane forming composition | Lupranol 3423 | 15 |
|  | ONVITEC wetting dispersant LT-9004 | 7 |
|  | Lupranol 3300 | 22 |
|  | Polyether polyol CF6925 | 10 |
|  | Pluracol GP740 | 19 |
|  | DABCO DC193 surfactant | 1.5 |
|  | DABCO T120 | 0.03 |
|  | POLYCAT 5 | 0.2 |
|  | Water | 2 |
|  | AROSIL 200 | 3 |
| Component B of the first polyurethane forming composition | Lupranat M20s | Volume ratio A/B = 2 |

In order to obtain a sandwich structure of cured mortar layer/polyurethane layer/cured mortar layer, three printing nozzles configured as mortar nozzle A/polyurethane nozzle B/mortar nozzle C were aligned and connected with the respective infeed pipes. The mortar composition in Table 1 was mixed and carried to nozzle A and nozzle C by two infeed pipes and later jetted out through nozzle A and nozzle C. The Component A and Component B of the first polyurethane forming composition were separately jetted from respective infeed pipes through nozzle B and mixed afterwards. Each printing nozzle was a square with side length of 1 cm. The nozzles are secured on a mobile carriage, which moves at a rate of 5 cm/s on the plane defined by X and Y axis (see FIG. 1). The mortar nozzle A and mortar nozzle C jet mortar at a rate of 4.5-10 g/s and the polyurethane nozzle B jets the first polyurethane forming composition at a rate of 0.5 g/s. The mobile carriage runs in opposite directions for adjacent slices of the sandwich structure: the carriage runs from left to right for one slice; when it reaches the end point on the right side and finishes printing the slice, it moves to the second vertical position on Z axis and runs from right to left to print the next slice over the slice that has just been completed. The length of the path that the mobile carriage covers for each slice is about 60 cm.

During the 3D printing process, the mortar compositions and the first polyurethane forming composition were jetted out and printed slice by slice by a 3D printer through mortar nozzle A/polyurethane nozzle B/mortar nozzle C using an automatic printing device to produce an integrated composite structure of cured mortar layer/polyurethane layer/cured mortar layer.

FIG. 1A shows the three parallelly aligned printing nozzles used in the present example. The nozzles on the left side and the right side are for mortar compositions. The nozzle in the middle is for the first polyurethane forming composition.

FIG. 1B shows the arm machine for 3D printing. The nozzles are secured on a mobile carriage mounted on the horizontal arm which is parallel to the imaginary X axis on the horizontal plane. The carriage can move along the horizontal arm while the horizontal arm can move independently along the imaginary Y and Z axes by a pre-set program. By controlling the movement of the carriage on the horizontal arm and the movement of the horizontal arm, the printing nozzles can reach virtually any point in the 3D space.

Figure 1C:
FIG. 1C shows an exemplary integrated composite structure of cured mortar layer/polyurethane layer/cured mortar layer obtained in the present invention.

FIG. 1C shows the obtained integrated composite structure of cured mortar layer/polyurethane layer/cured mortar layer, its length being defined by the movement of the three printing nozzles in X-Y plane, width being defined by the movement of the three printing nozzles along Z axis, thickness of each layer being defined by the dimension of the printing nozzles. The structure was left to cure overnight before being photographed. The white part in the middle is the polyurethane layer. The gray parts sandwiching the polyurethane layer are cured mortar layers. From the surface of the mortar layers, it can be observed that the slices actually stack along the Z axis to form the cured mortar layers.

Example 2

Example 2 simulates the inventive process by forming the polyurethane layer on the mortar sheet quickly after the mortar sheet is casted. The sample thus obtained is compared with another sample obtained by forming the polyurethane layer on a mortar sheet that is completely cured, which represents the combination of a non-3D printed cured mortar layer and a non-3D printed polyurethane layer. The binding of the cured mortar layer and the polyurethane layer is graded by determining the amount of polyurethane left on the surface of the cured mortar upon forceful separation of the combined cured mortar and polyurethane layers by hand. A surface fully covered by polyurethane is graded as 5 and a surface completely free of polyurethane is graded as 0. A bigger amount of polyurethane left on the surfaces indicates a better binding between the layers Example 3

By using the simulation experiment described in Example 2, a series of experiments in Example 3 were conducted to show how the binding between the mortar layer and the polyurethane layer is impacted by various parameters, particularly, by modification of mortar composition.

A series of experiments 3A to 3M were conducted by using the formulation in Table 3. The mortar composition optionally modified by the second polyurethane forming composition is prepared by mixing the ingredients of the mortar composition and the optional second polyurethane forming composition. The first polyurethane forming composition is prepared by mixing the ingredients of the first polyurethane forming composition. The initial setting time t2 of the unmodified mortar composition, the pot life t3 of the modified mortar composition and the gel time t1 of the first polyurethane forming composition were determined and are listed in Table 4.

TABLE 3

|    | The mortar composition, wt (g) | | | | The second polyurethane forming composition, wt (g) | | | |
| --- | --- | --- | --- | --- | --- | --- | --- | --- |
| Ex | Silicate cement, PC32.5R | F5 sand, 30 to 50 mashes | Super plasticizer, BASF V-30 | Water | Polyol, Lupranol TP1000 | Polyol, Lupranol 3300 | Polyisocyanate, Lurpranat M20s | Catalyst, Jeffcat ZR70 |
| 3A | 55 | 30 | 1.0 | 16.5 | | | | |
| 3B | 52 | 25 | 0.5 | 13 | 3.3 | 3.5 | 3.5 | 0.02 |
| 3C | 48 | 25 | 0.5 | 12 | 4.9 | 5.2 | 5.2 | 0.02 |
| 3D | 45 | 25 | 0.5 | 10 | 6.5 | 6.9 | 6.9 | 0.02 |
| 3E | 40 | 25 | 0.5 | 4 | 9.8 | 10.4 | 10.4 | 0.02 |
| 3F | 48 | 25 | 0.5 | 12 | 4.9 | 5.2 | 5.2 | 0.02 |
| 3G | 48 | 25 | 0.5 | 12 | 4.9 | 5.2 | 5.2 | 0.02 |
| 3H | 48 | 25 | 0.5 | 12 | 4.9 | 5.2 | 5.2 | 0.02 |
| 3I | 48 | 25 | 0.5 | 12 | 4.9 | 5.2 | 5.2 | 0.02 |
| 3J | 48 | 25 | 0.5 | 12 | 4.9 | 5.2 | 5.2 | 0.02 |

TABLE 3-continued

| | | | | | | | | |
|---|---|---|---|---|---|---|---|---|
| 3K | 48 | 25 | 0.5 | 12 | 4.9 | 5.2 | 5.2 | 0.02 |
| 3L | 48 | 25 | 0.5 | 12 | 4.9 | 5.2 | 5.2 | 0.02 |
| 3M | 48 | 25 | 0.5 | 12 | 4.9 | 5.2 | 5.2 | 0.02 |

| | The first polyurethane forming composition, wt (g) | | | | |
|---|---|---|---|---|---|
| Ex | Polyol, Lupranol 3300 | Foam stabilizer, Momentive L6900 | Polyisocyanate, Lupranat M50 | Catalyst, POLYCAT 8 | Water |
| 3A | 13 | 0.25 | 21.87 | 0.05 | 0.35 |
| 3B | 13 | 0.25 | 21.87 | 0.05 | 0.35 |
| 3C | 13 | 0.25 | 21.87 | 0.05 | 0.35 |
| 3D | 13 | 0.25 | 21.87 | 0.05 | 0.35 |
| 3E | 13 | 0.25 | 21.87 | 0.05 | 0.35 |
| 3F | 13 | 0.25 | 21.87 | 0.08 | 0.35 |
| 3G | 13 | 0.25 | 21.87 | 0.10 | 0.35 |
| 3H | 13 | 0.25 | 21.87 | 0.15 | 0.35 |
| 3I | 13 | 0.25 | 21.87 | 0.2 | 0.35 |
| 3J | 13 | 0.25 | 21.87 | 0.05 | 0.35 |
| 3K | 13 | 0.25 | 21.87 | 0.05 | 0.35 |
| 3L | 13 | 0.25 | 21.87 | 0.05 | 0.35 |
| 3M | 13 | 0.25 | 21.87 | 0.05 | 0.35 |

TABLE 4

| Ex | Content of the second polyurethane forming composition in the modified mortar composition (wt %) | Pot Life/initial setting time of the (modified) mortar composition (min) | Gel time of the first/ second polyurethane forming composition (min) | Settling time of the optionally modified mortar sheet (min) | Grading |
|---|---|---|---|---|---|
| 3A | 0 | 120 | 4.5/40 | 20 | 1 |
| 3B | 10.2 | 25 | 4.5/40 | 20 | 3 |
| 3C | 15.2 | 23 | 4.5/40 | 20 | 5 |
| 3D | 20.2 | 22 | 4.5/40 | 20 | 4 |
| 3E | 30.6 | 20 | 4.5/40 | 20 | 4 |
| 3F | 15.2 | 23 | 3/40 | 20 | 4 |
| 3G | 15.2 | 23 | 2.5/40 | 20 | 3 |
| 3H | 15.2 | 23 | 2/40 | 20 | 2 |
| 3I | 15.2 | 23 | 0.5/40 | 20 | 1 |
| 3J | 15.2 | 23 | 4.5/40 | 40 | 4 |
| 3K | 15.2 | 23 | 4.5/40 | 60 | 3 |
| 3L | 15.2 | 23 | 4.5/40 | 120 | 2 |
| 3M | 15.2 | 23 | 4.5/40 | 180 | 1 |

In each of experiments 3A to 3M, the optionally modified mortar composition was first casted into a mold to form a mortar sheet. The mortar sheet was allowed to settle for a certain time period (settling time) listed in Table 4 before the first polyurethane forming composition was casted on the surface of the mortar sheet. Experiments with shorter settling time simulates the 3D printing process, as the first polyurethane forming composition contacts the uncured or partially cured mortar composition as soon they were jetted from the respective printing nozzles.

After 48 hours since the casting of the first polyurethane forming composition, the cured mortar layer and polyurethane layer were separated by hand. The surface of the separated cured mortar sheet was graded according to the criteria described in Example 2. The experiment was conducted for four times and the average grading was listed in the Table 4.

Figure 2A:
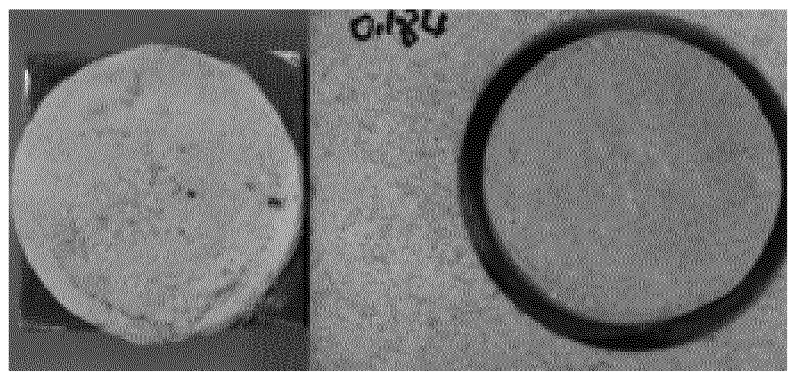
FIGS. 2A and 2B shows the separated surfaces of cured mortar and polyurethane of a simulated cured mortar layer/polyurethane layer composite structure in Example 3.
Figure 2B:
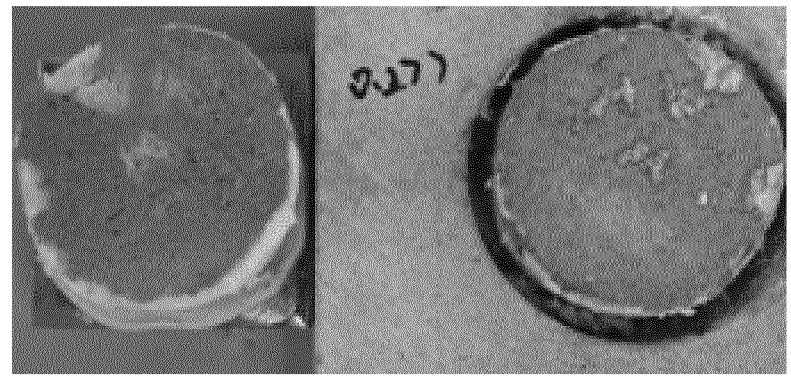

Ex. 3M and 3C in Table 3 were conducted to show the effect of 3D printing. Ex. 3M and 3C have the same composition for both modified mortar and polyurethane forming composition but different settling time of the modified mortar sheet. The first polyurethane forming composition was casted onto the mortar sheet after the mortar sheet was settled for 20 minutes after its formation in Ex. 3C, simulating a 3D printing process and after 180 minutes in Ex. 3M, representing a non-3D printing process. FIGS. 2A and 2B show the surface of cured mortar (the left side) and polyurethane (the right side) after forceful separation by hand in Ex. 3M and 3C, respectively. In FIG. 2B (i.e. Ex. 3C), it was observed that a significant amount of polyurethane was left on the surface of the cured mortar, making Ex. 3C a 5 point according to the grading rule. Whereas in FIG. 2A (i.e. Ex. 3M), it was observed that a very small amount of polyurethane was left on the surface of the cured mortar, making Ex. 3M a 1 point according to the grading rule. Therefore, it is obvious that by contacting the mortar and polyurethane shortly after their formation, i.e. by 3D printing, the inventors achieved much better binding between the mortar layer and the polyurethane than a non-3D process. Those skilled in the art will appreciate a similar improvement in binding between modified cured mortar layer and polyurethane layer in the actual integrated composite structure obtained by 3D printing.

Ex. 3A to 3E were conducted to demonstrate the effect of the modification of the mortar composition by the second polyurethane forming composition. It can be seen from Ex. 3A in Table 4 that, when the mortar composition was not modified by polyurethane and the cured mortar layer contacts polyurethane layer very shortly after its formation, the amount of polyurethane left on the surface of cured mortar was small after the separation of polyurethane layer and cured mortar layer. In contrast, it can be seen from Ex. 3B to Ex. 3E that the addition of the second polyurethane forming composition into the mortar composition increases the amount of polyurethane left on the surface of cured mortar (hence the grading). The improved grading indicates the improvement of binding between the modified mortar layer and polyurethane layer.

It should be clarified that the formulations of the mortar composition and the second polyurethane forming composition of Ex. 3A to Ex. 3E are made slightly different to ensure similar initial flowing behavior among the optionally modified compositions. For one example, in Ex. 3A, the amount of the super plasticizer BASF V-30 is doubled as compared with Ex. 3B to 3E so that the initial flowability of the mortar composition in Ex. 3A allows the subsequent casting step of the mortar composition. On the other hand, even if the formulations of the optionally modified mortar composition and the second polyurethane forming composition in Ex. 3A to 3E are different, it's still possible to achieve the beneficial effect of this invention, i.e. improved binding between the modified mortar layer and the polyurethane layer. Those skilled in the art will understand that such variations in the composition still constitute as embodying the ideas of the invention and they further demonstrate the robustness of the systems that can be used in this invention.

In Ex. 3C and 3J to 3M, the advantage of 3D printing is further shown by changing the settling time of the modified mortar sheet after which the first polyurethane forming composition is casted on the modified mortar sheet. Ex. 3M shows that when the first polyurethane was casted on the modified mortar after a longer time, there is only a small amount of polyurethane left on the mortar surface after forceful separation by hand. The grading increases from 1 to 5 when the settling time shortens from 180 minutes to 20 minutes in Ex. 3M to 3J and Ex. 3C. Ex. 3C shows that when the second polyurethane forming composition is casted on the modified mortar after a short time, creating a quick contact between the two layers, the amount of polyurethane left on the mortar surface reaches maximum among the five examples. The quick contact simulates the effect of 3D printing. Thus, it is further proved that an improved binding between polyurethane layer and mortar layer can be achieved by 3D printing.

The present inventors have surprising found that, the relationship between the initial setting time of the mortar composition t2, the gel time of the second polyurethane forming composition, and the pot life of the modified mortar composition t3 has the following relationship:
the initial setting time of the unmodified mortar composition t2>the gel time of the second polyurethane forming composition >the pot life of the modified mortar composition t3.

Furthermore, the effect of the curing rate of the first polyurethane forming composition is investigated in Ex. 3C and 3F to 3I by adjusting the amount of catalyst in the first polyurethane forming catalyst. It was observed that a shorter gel time of the first polyurethane forming composition led to a lower grading score, i.e. a poorer binding between layers, e.g. Ex. 3C with the longest gel time of the first polyurethane forming composition achieved the highest grading score while Ex. 3I with the shortest gel time achieved the lowest grading score. Therefore, it's important to find a good match between the respective curing rate of the first polyurethane forming composition and optionally modified mortar composition so that the binding between the two layers can be optimal.

The invention claimed is:

1. A process of fabricating a multi-layer composite structure by 3D printing, the composite structure comprising at least one cured mortar layer formed by curing of a mortar composition, and at least one polyurethane layer formed by polymerization of a first polyurethane forming composition, wherein
   the mortar composition and the first polyurethane forming composition are dispensed individually and simultaneously via adjacent printing nozzles,
   the mortar composition is modified before or after being dispensed by a second polyurethane forming composition to be a modified mortar composition,
   content of the second polyurethane forming composition is 0.1% to 50% by weight based on total weight of the modified mortar composition,
   pot life t3 of the modified mortar composition is 0.05 to 2 hours,
   an initial setting time t2 of the mortar composition when unmodified is greater than a gel time of the second polyurethane forming composition, and
   the gel time of the second polyurethane forming composition is greater than the pot life t3.

2. The process according to claim 1, wherein each of the at least one polyurethane layer is sandwiched between two of the at least one cured mortar layer.

3. The process according to claim 1, wherein slump of the modified mortar composition is 10 to 100 mm.

4. The process according to claim 3, wherein the slump of the modified mortar composition is 30 to 90 mm.

5. The process according to claim 3, wherein the slump of the modified mortar composition is 50 to 70 mm.

6. The process according to claim 1, wherein gel time t1 of the first polyurethane forming composition is 0.5 to 10 minutes.

7. The process according to claim 6, wherein the gel time t1 of the first polyurethane forming composition is 1 to 5 minutes.

8. The process according to claim 1, wherein the initial setting time t2 is 0.5 to 4 hours.

9. The process according to claim 8, wherein the initial setting time t2 is 1 to 2 hours.

10. The process according to claim 1, wherein
    gel time t1 of the first polyurethane forming composition is 0.5 to 10 minutes,
    the initial setting time t2 is 0.5 to 4 hours, and
    t2-t1<2 hours.

11. The process according to claim 10, wherein t2-t1<1.5 hours.

12. The process according to claim 10, wherein t2-t1<1 hours.

13. The process according to claim 1, wherein
    gel time t1 of the first polyurethane forming composition is 0.5 to 10 minutes, and
    t3-t1<0.5 hours.

14. The process according to claim 13, t3-t1<0.4 hours.

15. The process according to claim 13, wherein t3-t1<0.25 hours.

16. The process according to claim 1, wherein the mortar composition is modified by the second polyurethane forming composition by mixing with the second polyurethane forming composition before being introduced into the printing nozzles.

17. The process according to claim 1, wherein the first polyurethane forming composition comprises:
    (1) Component A comprising polyol; and
    (2) Component B comprising isocyanate, wherein Component A and Component B are mixed after being introduced into the printing nozzles.

18. The process according to claim 1, wherein the pot life t3 of the modified mortar composition is 0.1 to 1 hours.

19. The process according to claim 1, wherein the pot life t3 of the modified mortar composition is 0.2 to 0.5 hours.

20. The process according to claim 1, wherein the content of the second polyurethane forming composition is 5% to 30% by weight based on the total weight of the modified mortar composition.

21. The process according to claim 1, wherein the content of the second polyurethane forming composition is 10% to 20% by weight based on the total weight of the modified mortar composition.

22. The process according to claim 1, wherein the second polyurethane composition comprises a polyester polyol and/or polyether polyol with two or more hydroxyl groups, and an isocyanate selected from aliphatic, alicyclic and aromatic isocyanates or prepolymer thereof with two or more isocyanate groups.

* * * * *